Dec. 27, 1966    R. D. KACHMAN ETAL    3,294,209
FRICTION MECHANISM WITH SAPPHIRE FRICTION SURFACE
Filed Sept. 15, 1964

INVENTORS
Robert D. Kachman
William R. Kee
BY

United States Patent Office 3,294,209
Patented Dec. 27, 1966

3,294,209
FRICTION MECHANISM WITH SAPPHIRE FRICTION SURFACE
Robert D. Kachman, Madison Heights, and William R. Kee, Birmingham, Mich., assignors to the United States of America as represented by the United States Atomic Energy Commission
Filed Sept. 15, 1964, Ser. No. 396,783
1 Claim. (Cl. 192—66)

The invention described herein was made in the course of, or under, a contract with the U.S. Atomic Energy Commission.

This invention relates to friction elements for mechanical clutches, brakes and the like.

The requirements imposed on friction elements of clutches, brakes, etc., depend on the temperature of the environment and the elevation of temperature in the friction element and associated mechanism due to sliding friction. It is well known that the generation of heat in automotive brakes in excess of the capabilities of the friction element, termed "brake lining," results in the type of failure known as "fade." The failure of such friction elements under conditions of excessive heat generation is due to a severe reduction in the coefficient of friction of the friction element surface. A frequent resultant effect of a condition of fade is a permanently glazed condition of the surface of the friction lining requiring either that the surface be removed or that the friction lining be replaced.

In addition to applications of friction devices which fail because of imposed demands in excess of capability, there are other applications where the friction device may be located in an environment of high temperature in excess of friction element endurance to begin with. In these applications, the conditions are unfavorable for adequate dissipation of generated heat for the reliable preservation of friction characteristics even if the friction device is idle.

It is, therefore, an object of the present invention to provide a friction element capable of withstanding severe workloads without fade.

It is another object of this invention to provide friction elements for clutches or brakes which are capable of preserving its coefficient of friction without deterioration under high ambient or working temperature conditions.

Figure 1:
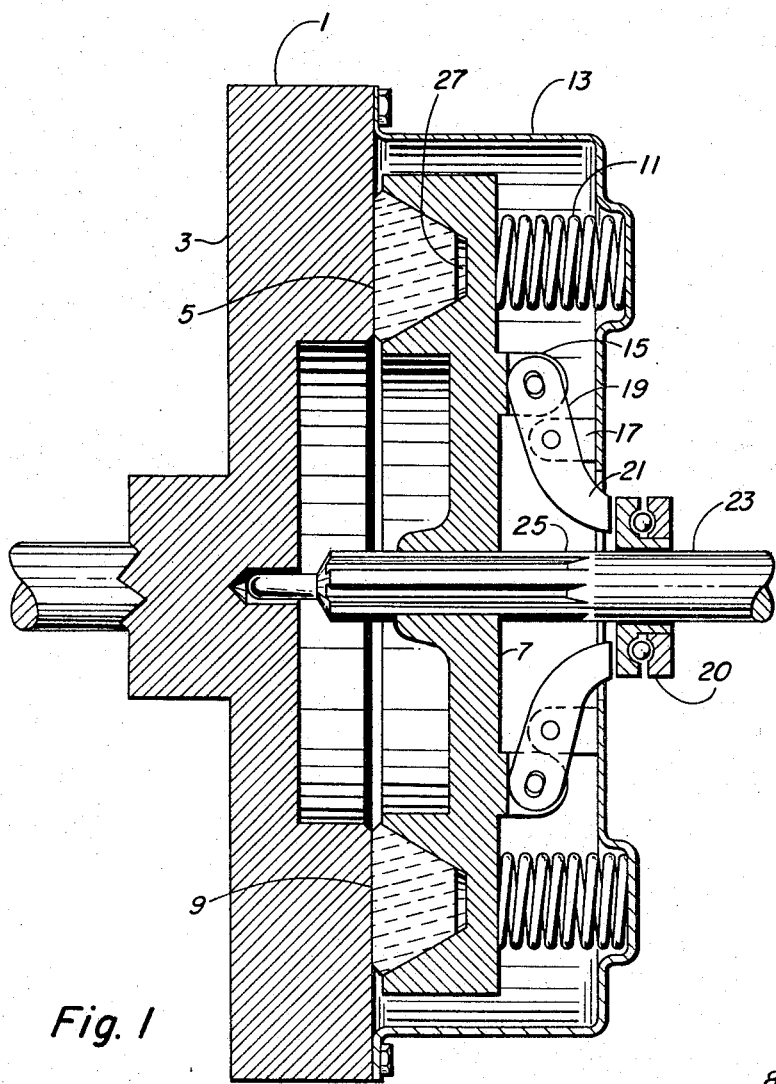
Figure 2:
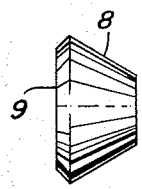

Other objects and advantages of the friction element of the present invention will appear from the following description, when taken in conjunction with the accompanying drawings, which are intended to represent an illustrative embodiment of the invention and not limitations thereof and wherein:

FIGURE 1 is a plan view in axial section of a clutch of the automotive type in accordance with this invention. FIGURE 2 is a side view of the friction element per se.

Referring to FIGURE 1, the numeral 1 denotes a complete clutch assembly. In brief, such an assembly comprises a driving element 3 having a friction face 5 and a driven element 7 having a friction face or faces 9. Pressure to provide sufficient friction is obtained by a plurality of springs 11. The springs 11 are seated at one end in a housing 13 which is bolted or otherwise affixed to the edge of the driving element 3. The other end of the springs engages the driven element 7. Means are usually provided in such clutches to remove the spring pressure from the friction surfaces. In the embodiment shown, the driven element 7 is provided with bifurcated hinge lugs 15. Housing 13 is also provided with bifurcated hinge elements 17 offset with respect to hinge elements 15 so that levers 19 can be pivoted in both hinge elements 15 and 17. Levers 19 are provided with an extension portion 21 to engage a bearing commonly known as a clutch release or "throw-out" bearing 20. Driven element 7 rides upon driven shaft 23 in slidable relationship on splines 25 provided on shaft 23.

The energy in driving element 3 is transmitted to the driven element entirely through the friction faces thereof. Under conditions of slip, the heat generated in the friction faces may be so severe as to destroy the friction elements of the prior art. In accordance with the present invention, friction elements, designated generally by the numeral 8, are desirably of the family of ceramics, opaque quartz or synthetic sapphire. Although these elements provide excellent friction devices, they also impose difficulties in utilization because of their brittleness and different coefficients of expansion that metals. Prior to the present invention, suitable means of mounting these materials have not been known.

In accordance with the present invention, means are provided to anchor the friction element without stress. The technique herein disclosed is based upon the fact that if the friction element is made in the form of a frusto-conical button, the button may change in size when heated but the angle remains constant. Accordingly, the driven element is provided with frusto-conical recesses 27 in which are seated frusto-conical friction elements 8. It has been determined that when a friction button of this type is located in the metal driven member and the temperature of the assembly is raised, the metal expands further than the button with the result that the button simply recedes into the driven element and relocates itself. This action poses only compressive stresses upon the button, thus removing the cause of breakage of brittle materials. When the temperature of the assembly is lowered, the angle of the button is such that the button simply moves outward in the conical socket.

FIGURE 2 shows the details of a desirable configuration of a friciton element. Opposite lateral sides of the element converge on an internal angle of 60° with respect to each other. The edge of the friction surface is chamfered to an angle of 60° with respect to the face of the element which prevents spalling due to friction and heat stresses. Although the element and seat have been described as circular in cross section, it is apparent that any wedge shape, such as a frusto-pyramid, may be used. It is also not necessary that the frustum-shaped friction element button and seat be in all cases symmetrical. For example, in some cases the side of the button and the wall of the recess which transmit the thrust may be at any angle intermediate zero and 30 degrees with respect to the axis of the element and the opposite side may have a converging angle of a value to produce an internal angle of 60 degrees, approximately with the thrust side.

The friction elements of the present invention are not limited to a clutch, such as shown in FIGURE 1, but are, in fact, applicable to any friction system. For example, the friction element 8 and frusto-conical seat 27 are applicable to disc brakes for automotive purposes.

A desirable feature of the friction element of the present invention is that it is easily and quickly changeable and does not require screws or other fastening devices.

It will be understood that numerous variations may be made in the mechanism without departing from the scope of the invention. For example, the friction buttons of this invention may have a cylindrical friction surface so that it will then be applicable to cylindrical friction systems. In short, the friction mechanism of the present invention is applicable in any situation in which sliding friction and the ability to withstand wide temperature variations are necessities.

What is claimed is:

A friction device for clutches, brakes and the like, comprising a driving friction member and a driven friction member having friction faces in pressure contact; at least one friction element of brittle, elevated temperature resistant nature, such as sapphire having a frustoconical shape with opposite lateral faces converging on an angle of 60 degrees, seating in a like-shaped recess in one of said members and extending outwardly of the face of the member a small distance compared to its length, and being chamfered around the edge of the extended portion.

References Cited by the Examiner

UNITED STATES PATENTS

| | | | |
|---|---|---|---|
| 1,531,510 | 3/1925 | Ryon | 192—107 |
| 1,605,562 | 11/1926 | Short | 192—68 |
| 2,203,411 | 6/1940 | Green | 308—159 |
| 3,027,979 | 4/1962 | Pocock | 192—107 |

FOREIGN PATENTS 453,345  12/1948  Canada.

DAVID J. WILLIAMOWSKY, *Primary Examiner.*